US012563106B2

(12) United States Patent
Bright et al.

(10) Patent No.: US 12,563,106 B2
(45) Date of Patent: *Feb. 24, 2026

(54) MEDIA GATEWAY FOR TRANSPORTATION OF MEDIA CONTENT

(71) Applicant: Amazon Technologies, Inc., Reno, NV (US)

(72) Inventors: Norman Bright, Pessac, OR (US); Sabar Mourad Souag, Camass, WA (US); Eric Woodruff, Portland, OR (US); Joseph Yuhas, Portland, OR (US); Thomas Dytko, Portland, OR (US); William Kennemer, Oregon City, OR (US); Yelena Tanaomi, Beaverton, OR (US); Luke Richard Pierce, Seattle, WA (US); Harsh Ramachandran, Portland, OR (US); Akhil Ramachandran, Hillsboro, OR (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/782,743

(22) Filed: Jul. 24, 2024

(65) Prior Publication Data

US 2024/0380794 A1 Nov. 14, 2024

Related U.S. Application Data

(63) Continuation of application No. 17/710,209, filed on Mar. 31, 2022, now Pat. No. 12,088,636.

(51) Int. Cl.
| | |
|---|---|
| *H04L 65/1023* | (2022.01) |
| *H04L 65/611* | (2022.01) |
| *H04L 65/612* | (2022.01) |

(52) U.S. Cl.
CPC ........ *H04L 65/1023* (2013.01); *H04L 65/611* (2022.05); *H04L 65/612* (2022.05)

(58) Field of Classification Search
None
See application file for complete search history.

(56) References Cited

U.S. PATENT DOCUMENTS

| | | | |
|---|---|---|---|
| 9,032,081 B1 | 5/2015 | North | |
| 2010/0080413 A1* | 4/2010 | Chen ................. | H04N 21/6582 382/100 |

(Continued)

OTHER PUBLICATIONS

U.S. Non-Final Office Action issued in U.S. Appl. No. 17/710,209 dated Dec. 15, 2023.

(Continued)

*Primary Examiner* — Mohamed Ibrahim
(74) *Attorney, Agent, or Firm* — Hogan Lovells US LLP

(57) ABSTRACT

A content distribution environment enables acquisition of a video feed in a first format, conversion into a second format, and transmission to a cloud service using on-premises equipment managed and operated by the content provider. A gateway or bridge may facilitate operation with one or more managed services, such as a content distribution service, that provides a reliable way to ingest a video stream from a source, replicate the video stream to one or more destinations, and permit sharing of video streams to affiliates and partners. The on-premises equipment may execute a software package to provide end-to-end operations that leverage operations of a cloud service while executing on content provider owned or managed hardware.

20 Claims, 9 Drawing Sheets

(56) References Cited

U.S. PATENT DOCUMENTS

2014/0351383 A1    11/2014  Wan
2015/0332357 A1*   11/2015  McBride ................. H04L 67/51
                                                        705/26.1
2016/0057317 A1     2/2016  Zhao

OTHER PUBLICATIONS

U.S. Notice of Allowance issued in U.S. Appl. No. 17/710,209 dated May 16, 2024.

* cited by examiner

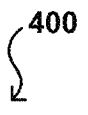
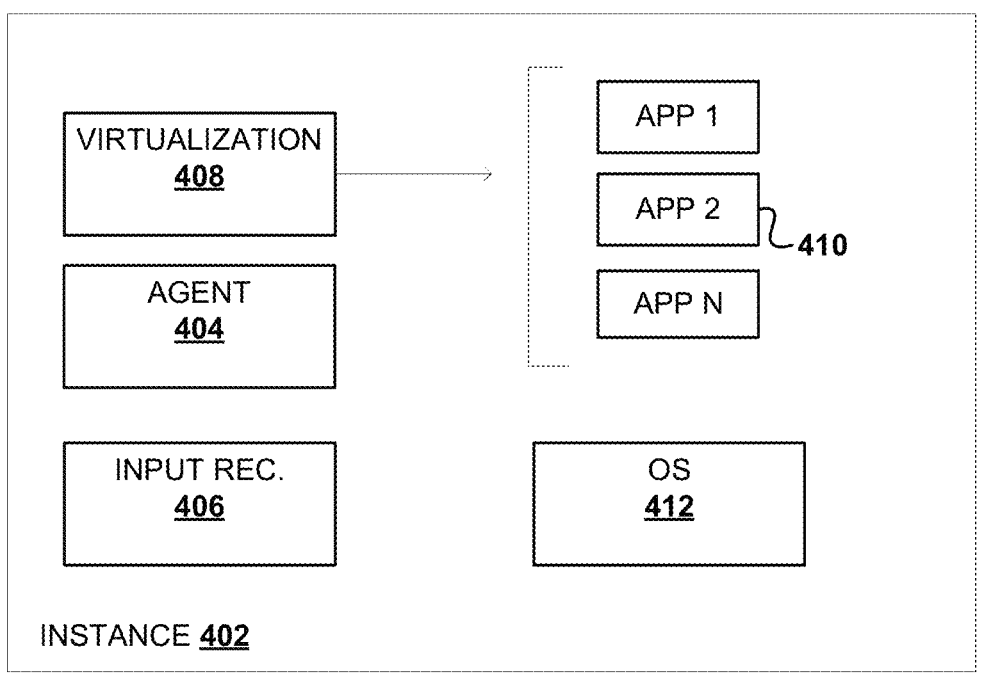
FIG. 4

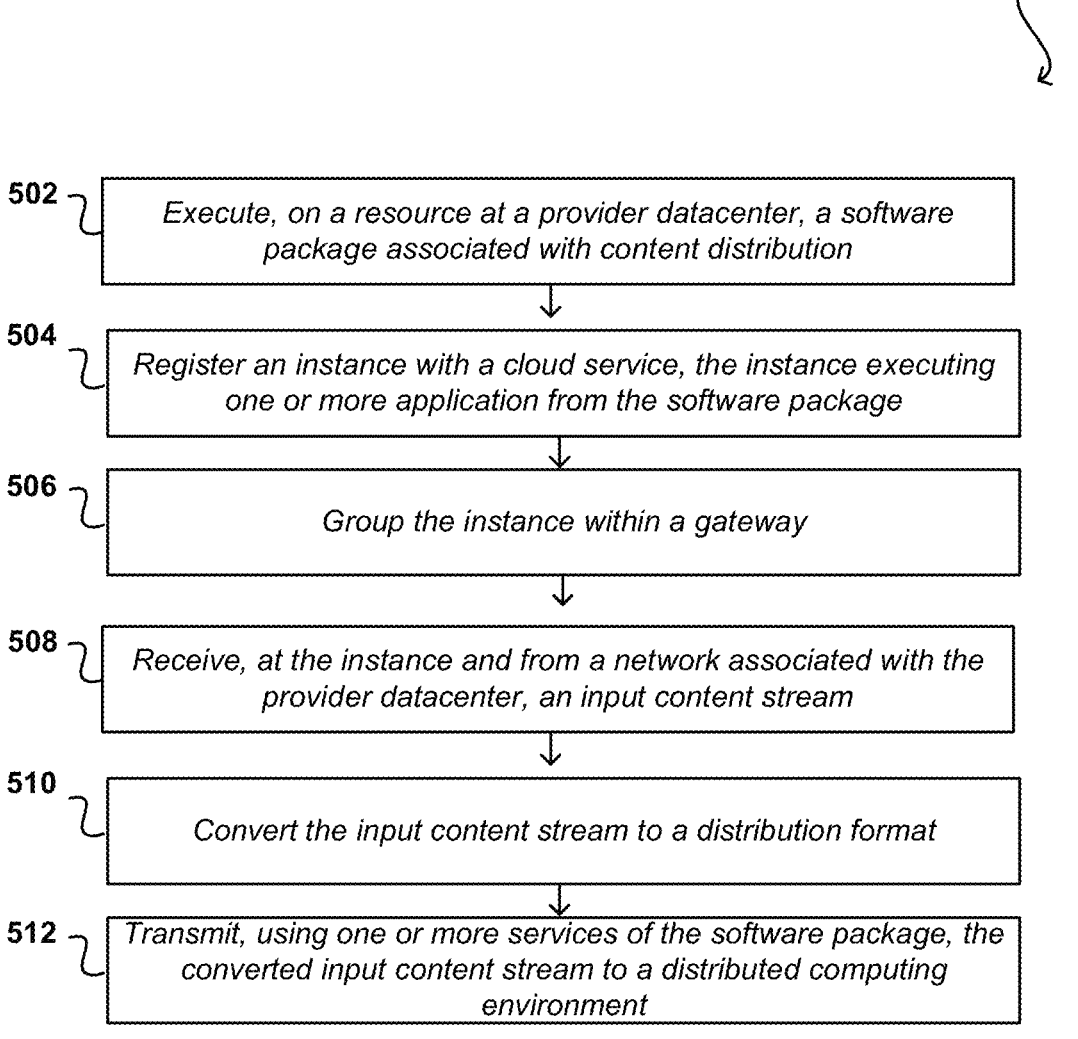

500

502   Execute, on a resource at a provider datacenter, a software package associated with content distribution 504   Register an instance with a cloud service, the instance executing one or more application from the software package 506   Group the instance within a gateway 508   Receive, at the instance and from a network associated with the provider datacenter, an input content stream 510   Convert the input content stream to a distribution format 512   Transmit, using one or more services of the software package, the converted input content stream to a distributed computing environment

FIG. 5

600

602 — *Receive, at a cloud service and from a content provider, a content stream, the content stream provided to a flow of the cloud service via a registered bridge*

604 — *Receive, from the content provider, instructions associated with the content stream*

606 — *Determine, from the instructions and as a portion of the flow, one or more destination endpoints for the content stream*

608 — *Execute, within the flow, one or more operations on the content stream*

610 — *Transmit, to the one or more destination endpoints, the content stream*

FIG. 6

700

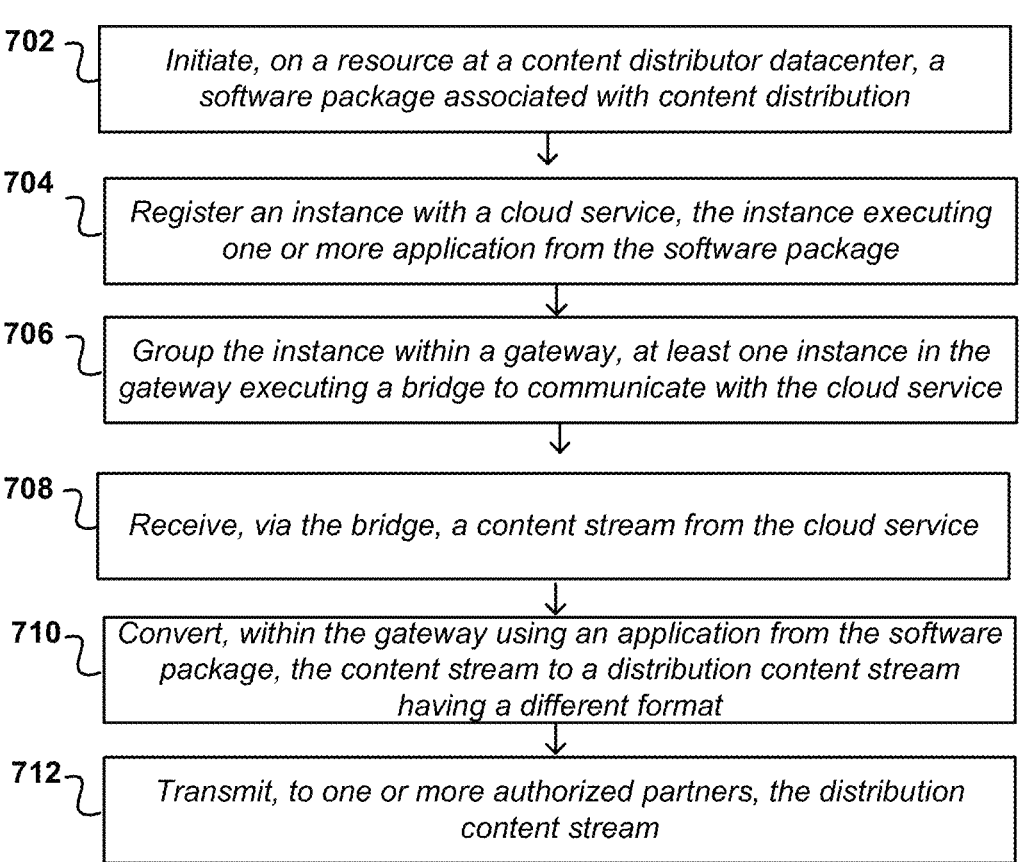

702

Initiate, on a resource at a content distributor datacenter, a software package associated with content distribution

704

Register an instance with a cloud service, the instance executing one or more application from the software package

706

Group the instance within a gateway, at least one instance in the gateway executing a bridge to communicate with the cloud service

708

Receive, via the bridge, a content stream from the cloud service

710

Convert, within the gateway using an application from the software package, the content stream to a distribution content stream having a different format

712

Transmit, to one or more authorized partners, the distribution content stream

FIG. 7

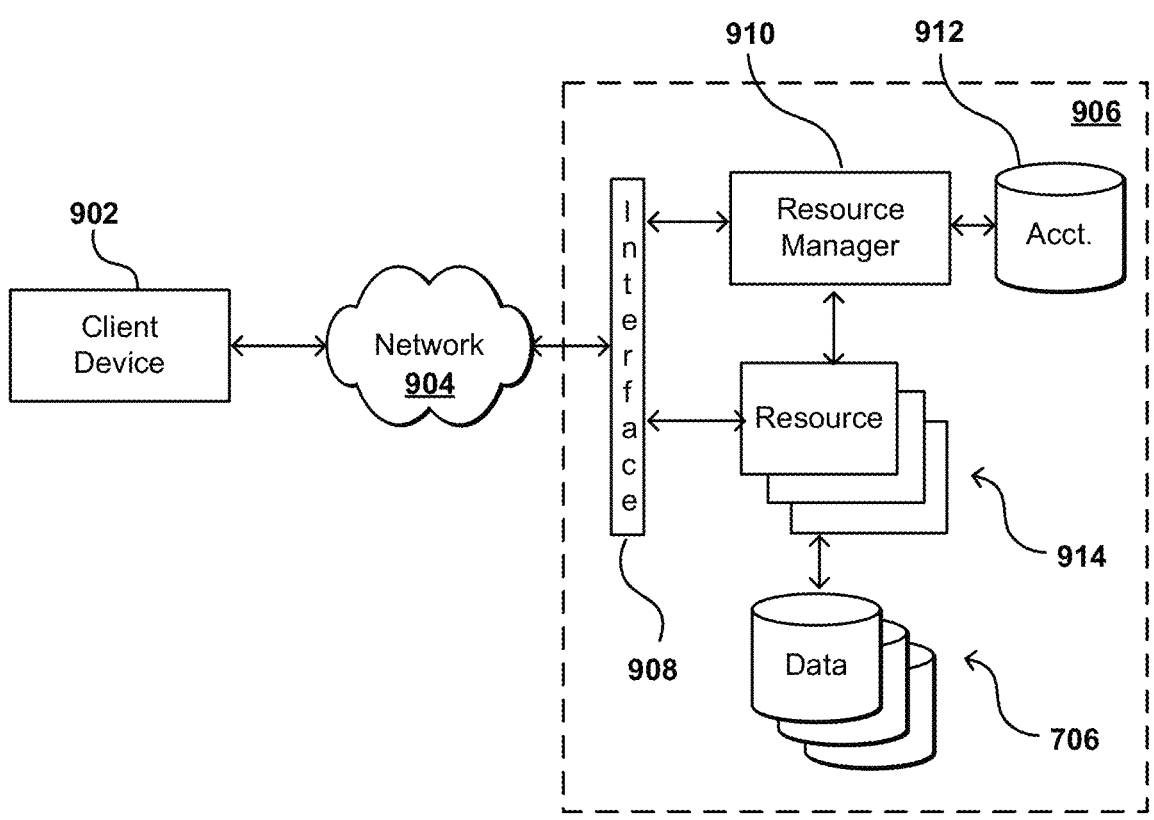
FIG. 9

MEDIA GATEWAY FOR TRANSPORTATION OF MEDIA CONTENT

CROSS-REFERENCES TO RELATED APPLICATIONS

This application claims the benefit or priority and is a continuation of allowed U.S. application Ser. No. 17/710, 209, filed Mar. 31, 2022, entitled "MEDIA GATEWAY FOR TRANSPORTATION OF MEDIA CONTENT," the disclo- sure of this application is incorporated by reference in its entirety herein for all intents and purposes.

BACKGROUND

Content providers may generate media content, such as from a live video stream, and use one or more providers to distribute the media content to a variety of different desti- nations. The distribution may occur over costly satellite or fiber services or using a distributed computing environment. Formatting of the media content at an on-premises location of the content provider is often incompatible with the distributed computing environment, often leading to one or more conversions or reconfiguration steps prior to transmis- sion to the distributed computing environment. The conver- sion and distribution may be costly, involve multiple third- party platforms, and increase complexity for the content providers.

BRIEF DESCRIPTION OF THE DRAWINGS

Various embodiments in accordance with the present disclosure will be described with reference to the drawings, in which:

FIG. 4 illustrates an example architecture for content distribution in accordance with various embodiments.

FIG. 5 illustrates an example process for on-premises content distribution to a cloud service that can be utilized in accordance with various embodiments.

FIG. 6 illustrates an example process for content distri- bution to an endpoint from a cloud service that can be utilized in accordance with various embodiments.

FIG. 7 illustrates an example process for content distri- bution to an affiliate from an endpoint that can be utilized in accordance with various embodiments.

FIG. 9 illustrates components of another example envi- ronment in which aspects of various embodiments can be implemented.

DETAILED DESCRIPTION

Approaches in accordance with various embodiments provide an on-premises infrastructure to support content capture, processing, and transmission to a distributed com- puting environment (e.g., "cloud") for distribution to a variety of different endpoints. Embodiments may provide for acquisition of a live video feed in a first format (e.g., multicast), conversion into a second format (e.g., unicast), and transmission to a cloud service using on-premises equipment managed and operated by the content provider. Furthermore, embodiments may provide for the receipt of content, such as at a designated endpoint, for conversion back to the first format and then distribution. In at least one embodiment, systems and methods provide a gateway and/ or bridge to facilitate operation with one or more managed services, such as a content distribution service, that provides a reliable way to ingest a video stream (e.g., a live video stream, a recorded video stream, a stored video stream) from a source, replicate the video stream to one or more destina- tions, and permit sharing of video streams. It should be appreciated that embodiments are not limited to only video streams, but video streams may be described for conve- nience. Various embodiments may provide a managed sys- tem for use in an on-premises location, such as a provider controlled datacenter.

In at least one embodiment, a gateway may be provided at an on-premises location that uses one or more server- based or serverless services, which may be referred to as containers. A container orchestration service may enable providers to run and manage software container applications on their own infrastructure, enabling a "bring your own device" style of management and operation. Such an imple- mentation may then utilize a public IP or direct connect communication with a partner cloud service. The gateway may be used to manage connection to the cloud service, which may be used to manage and distribute one or more signals, such as video signals to end-users and/or specified endpoints using a variety of supported methods (e.g., third- party content distribution networks, satellite/fiber connec- tions, etc.). Embodiments may provide for improvements in fleet management, where providers can direct or otherwise point different feeds to multiple stations or partners at the same time, thereby permitting scaled distribution workflows that can manage a variety of separate feeds with a single device.

Figure 1:
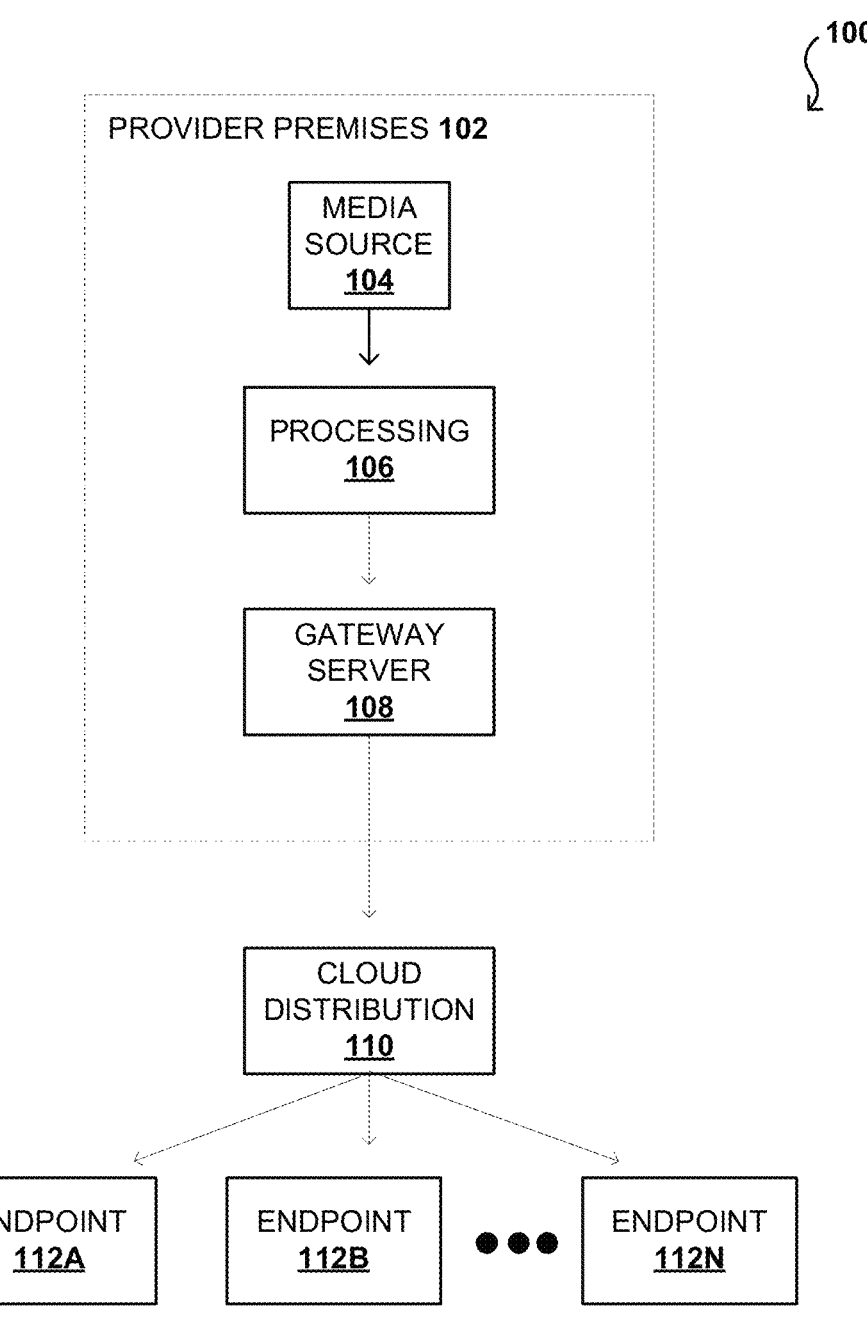
FIG. 1 illustrates an example environment for content distribution that can be utilized in accordance with various embodiments.

FIG. 1 illustrates an example distribution environment 100 that can be utilized in accordance with various embodi- ments. In this example, a provider premises 102 (e.g., a content provider premises, a cloud contribution premises, a contributor premises, a cloud contributor premises, an egress premises, etc.) may include one or more datacenters that include servers having one or more processors or memories. The datacenter may be referred to as an "on-premises" or "on-prem" location in that a content provider may have control of or ownership over the infrastructure. In at least one embodiment, the on-prem location may not be at an exact physical location as a media source 104. That is, a media source 104 may include a video stream, by way of example, that is transmitted over one or more networks associated with the datacenter of the provider premises 102. However, the media source 104 need not be at the same physical location as the cloud contribution provider prem- ises 102 and may be at a remote location where the direct feed from the media source 104 is transmitted to the cloud contribution provider premises 102.

The cloud contribution provider premises 102 may include the datacenter with a variety of different servers or other infrastructure, which may implement a processing module 106. The processing module 106 may be used for one or more encoding/decoding operations, compression, or the like. For example, encoding/decoding may be utilized for a particular service or management system, such as a cloud encoder. In at least one embodiment, the processing module 106 may perform encoding, packaging, delivering, receipt, and decoding of content, such as video content. One or more of the processing operations may be part of a managed service associated with a cloud distribution service that provides the cloud contribution provider various different management and operational benefits under a unified framework.

In this example, a gateway server 108 is utilized for transmission, for example over one or more networks, to a cloud distribution service 110. It should be appreciated that the gateway server 108 may also receive transmissions for distribution, as will be described herein, for clarity the gateway server 108 is being described for transmission to the cloud distribution service 110. The cloud distribution service 110 may include one or more compute resources (e.g., executing virtual machines (VM) instances or containers, executing batch jobs, executing code without provisioning services, etc.), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build-deployment services), access policies or roles, identity policies or roles, machine images, routers and other data processing resources, etc. In at least one embodiment, a provider (e.g., cloud contribution provider, ingress provider, customer, user, etc.) may have an account associated with the cloud distribution service 110, where credentials are provided in order to gain access to and implement control over resources of the cloud distribution service 110. In at least one embodiment, such an account is linked or otherwise associated with software, which may be container-based software, executed on-prem at the cloud contribution provider premises 102. The provider may interact with the cloud distribution service 110 through one or more intermediate networks and/or through one or more application programming interfaces (APIs).

In various embodiments, the cloud distribution service 110 may execute one or more flows (e.g., cloud flows, workflows) upon receipt of the media content associated with the media source 104. For example, the cloud flow may provide one or more additional processing steps, such as formatting changes, security protocols, and the like. As noted above, one or more of these steps within the cloud flow may also be part of the managed service provide by the cloud distribution service 110, where the cloud contribution provider may have access to one or more features associated with the cloud flow. The cloud distribution service 110 also provides a central location from which to distribute content to a variety of different endpoint 112A-112N. For example, the endpoints 112 may be different affiliates associated with the content provider that receive the content at their respective on-prem locations for further distribution, such as to local viewers. In this manner, acquisition, formatting, and distribution of media content, such as live video content, may be managed using a single end-to-end service that leverages cloud distribution to reduce complexity and costs when compared with traditional services that utilize a variety of third-party providers and more costly distribution schemes.

In at least one embodiment, distribution of video content may begin with one or more cameras, such as a video camera, recording at a location. The feed from this recording may be provided, over one or more networks, to an on-premises datacenter, where one or more encoding operations, among other processing techniques, may be applied to the video stream. In at least one embodiment, at least one server within the datacenter may be registered for use with a cloud distribution system, such as via downloading or otherwise installing a computing resource to the datacenter, such as a container. An on-prem instance may be registered and connected to the cloud distribution system, which may provide in interface for the user to select various distribution locations for the content, among other options. These affiliates may also have a gateway server or on-prem container at their datacenters, and as a result, may receive and then utilize the video content.

Various embodiments may provide a gateway or on-premises solution to utilize a transport service for media content, such as live video, from an on-premises location to a cloud distribution system. This solution may be used to overcome problems with present distribution systems that often rely on satellite or fiber to send media content, such as live video, to affiliates and content partners. Satellite and fiber have drawbacks such as long lead times, extensive up-front commitments, and an inability to scale. Moreover, certain distribution systems also only receive content from a single point, as opposed to across a user's entire network like the present embodiments, and are also limited to their distribution using a less-efficient unicast traffic model. Systems and methods provide for improvement distribution by allowing content providers to send media content, such as live video, from any source on an internal provider network and then simultaneously distribute the media content to a variety of different affiliates and content partners in a fan-out fashion.

Systems and methods may be implemented to execute from a container (e.g., a unit of software packages and all dependencies) via an orchestration service that permits a user to run and manage software container applications using on premises infrastructure. For example, users may launch a software container on a single server connected to an on-prem network and then register an on-prem instance for control through a cloud provider. This control interface may permit users to select a video feed associated with their registration with the cloud provider for upload to a cloud environment, where the feed may be selected for further distribution. In at least one embodiment, selected feeds may be pushed out to all selected on-prem destinations via Direct Connect or public IP simultaneously. It should be appreciated that these destinations may also be registered with the cloud provider. The received content may then be distributed to end users through a variety of different channels.

Various embodiments permit scaling of video distribution by not limiting a number of on-prem destinations. Increasing a volume of the video distribution will further not affect latency or service uptime at least because systems and methods send out video feeds in a fan-like fashion, where each output flow is tunneled by itself. Furthermore, embodiments also permit users to control which regions they use for inputting and outputting their video feeds. Accordingly, various embodiments provide for improved fleet management, as users may point or direct their video feeds toward multiple stations or partners at the same time, which allows users to scale distributions and workflows and manage tens or hundreds of separate feeds with a single device. Also, services associated with the cloud provider may be leveraged to eliminate the use of third-party monitoring/administration tools.

Systems and methods may also provide a managed service that includes access to and utilization of various cloud-based applications from the on-prem location. For example, embodiments may enable integration with one or more fully managed cloud services, such as a media service. The managed cloud service may provide a reliable way to ingest a live video stream, among other content streams, from a single source outside of the cloud (e.g., the cloud content provider premises). Additionally, the managed service may further replicate the video stream to one or more destinations. Moreover, the cloud contribution provider may share content streams with other users of the cloud service and/or to destinations outside of the cloud service. The managed service may provide a secure operating platform for these services that includes various support applications, such as monitoring or security applications. The managed service may be accessible via an API and management console interface to permit rapid implementation of various cloud flows. The API may be accessible through a gateway, such as the gateway server 108, which may include one or more instances that permit various calls to the managed cloud service. Additionally, as will be described below, the gateway server 108 may further include one or more bridges to facilitate communication or and receipt of data.

Various embodiments provide a cellular architecture implemented across the cloud service provider where different regions may have their own set of cells, which may include a primary cell and several flow cells. The primary cell may contain the API gateway, acting as the point of interaction for different user requests. In at least one embodiment, the primary cell may be implemented as a minimal routing layer that routes different requests to an associated flow cell for execution of task-specific logic. The flow cells, on the other hand, may be associated with a particular primary cell and may contain specific customer resources, such as flow records, elastic IP addresses (EIPs), elastic network interfaces (ENIs), and logic to process user requests.

In at least one embodiment, API requests may be routed through the API gateway to different flow cells that may include flow records storing a particular user flow configuration. For example, the flow configuration may include source and output configurations, among other features of a cloud flow, that may be used to receive, process, and distribute the content. In various embodiments, resources may be allocated as the flow cells become active (e.g., upon request), which may reduce costs for users with respect to allocated resources that are not performed their tasks. However, when a customer requests a flow start, a task may begin and be placed on an instance associated with the distributed environment. For example, a request to begin a flow may be received and a flow record may be accessed in order to determine one or more steps associated with the flow. In various embodiments, a task is then created and loaded onto an instance, for example via a bootstrap to control instance resource allocation, which may include attaching ENIs, establishing protections, attaching security groups, attaching EIPs, and the like.

As noted herein, a containerized software package may enable execution of one or more processes or tasks associated with the managed service. For example, one or more containers may include flow execution, bootstrap configurations, and different data streamers. The bootstrap may execute at a start and end of an instance, as noted above, to attach and detach associated network resources to the instance, and may also perform one or more configuration steps in order to establish the instance in accordance with customer or provider settings. Flow execution may include queries to the flow tables for configuration information and updates. Data streams may be responsible for network communications and implementing logic to interpret various video transport stream protocols. It should be appreciated that each data streamer may support multiple inputs and outputs.

Figure 2:
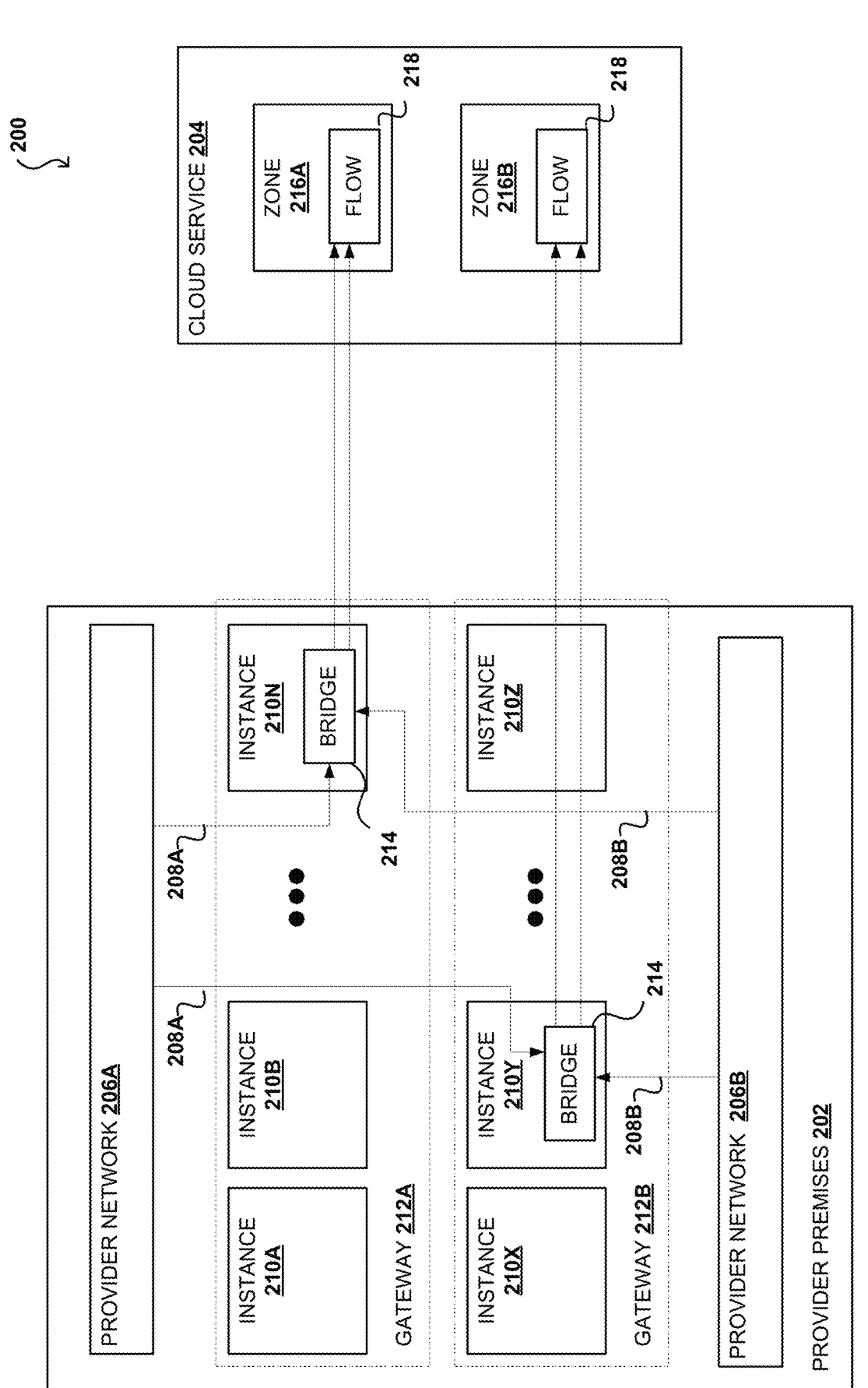
FIG. 2 illustrates an example environment for content distribution that can be utilized in accordance with various embodiments.

FIG. 2 illustrates an example distribution environment 200 which may be used with embodiments of the present disclosure. It should be appreciated that various components of the environment 200 may be removed or simplified for clarity with the following discussion. Moreover, while certain components may be shown as being grouped within a single classification, it should be appreciated that various features may be separated and/or accessible, such as from a remote service, and that illustration of different capabilities or component within a common system is not intended to limit the scope of the present disclosure to such implementations. In this example, a cloud contribution provider premises 202 (e.g., a content provider premises, a provider premises, a contributor premises, a cloud contributor premises, an ingress premises, etc.) is communicatively coupled to a cloud service 204, for example via one or more networks that may utilize one or more different communication protocols, such as Direct Connect or public IP, as examples only. It should be appreciated that the cloud contribution provider premises 202 and the cloud service 204 may share one or more features with the cloud contribution provider premises 102 and the cloud distribution service 110, respectively, of FIG. 1. Various embodiments may also utilize proprietary protocols to facilitate communication between the cloud contribution provider premises 202 and the cloud service 204, where these protocols may be updated and changed in accordance with information that may be collected by the cloud service 204. For example, over time, the cloud service 204 may monitor different aspects of a connection to the cloud contribution provider premises 202, such as for latency or throughput, and then adjust one or more features of the connections in order to provide improved services and/or in accordance with various policies and procedures.

As noted, the cloud contribution provider premises 202 may refer to a datacenter and/or one or more servers that are associated with a content provider. The content provider may be said to have control of the equipment with the cloud contribution provider premises 202, for example, the content provider may own or otherwise maintain their own equipment. Furthermore, in at least one embodiment, the cloud contribution provider premises 202 may encompass multiple different physical locations and/or may send or receive information to and/or from multiple locations. For example, the cloud contribution provider premises 202 may receive a video feed from a camera that is transmitted over one network to the provider premises. However, in at least one embodiment, the feed may be received at an on-site or substantially on-site location associated with the cloud contribution provider premises 202.

In this example, the cloud contribution provider premises 202 has its own networks 206A, 206B, which may be duplicative for redundancy purposes, but may also be separate networks. These networks 206 may transmit one or more feeds 208 from a source, such as a video camera where the feeds are live video feeds, to different computing units associated with the cloud contribution provider premises 202 for transmission to the cloud service 204. In this example, various instances 210 are grouped into gateways 212, which may share one or more features with gateway servers 108 of FIG. 1. Instances 210 may refer to one or more servers that have been registered to run a script or otherwise be associated with the distribution process. For example, instances 210 may include VMs that execute on the underlaying hardware that is owned by the providers within the cloud contribution provider premises 202. In at least one embodiment, instances 210 may be provisioned such that multiple instances 210 are running on a single server or within a single rack. It should be appreciated that instances 210 may be provisioned, operated, or shut down in accordance with various operating conditions, and in some embodiments, there may be minimum or recommended operating requirements in order to utilize the service.

The gateways 212 may represent a logical grouping or clustering of instances 210, but it should be appreciated that the gateways 212 may be virtual groupings and not a physical separation or cluster of instances. Furthermore, gateways 212 may include different servers, different racks, or different datacenters, among other options. It should be appreciated that gateways 212 may include any number of instances 210 and that gateways 212 do not need to have the same number of instances as other gateways 212. In at least one embodiment, a first gateway 212A may include any number of instances 210A-210N while a second gateway 212B may include any number of instances 210X-210Z. In this example, instances 210 are only positioned within a single gateway. Accordingly, the gateways 212 may be used in order to prevent hardware overlap between instances 210. That is, instances 210 within the first gateway 212A may execute on different hardware than the instances 210 within the second gateway 212B. As a result, redundancy or backup capabilities may be provided where if the first gateway 212A ceases operations that the second gateway 212B, and its associated instances 210, will not be affected.

In at least one embodiment, there may be hardware overlap between instances 210, but such overlap may be limited to non-paired instances 210. By way of example only, the first gateway 212A and the second gateway 212B may be executing to provide the same feed to the cloud service 104, with instances 210X-210Z in the second gateway 212B being redundant with respect to the instances 210A-210N in the first gateway 212A. In some configurations, certain instances may be paired or otherwise associated with other instances, such as the instance 210A being paired with the instance 210X. Because these instances 210A, 210X are paired with one another, it may be desirable to ensure that they are on different underlying hardware, which may be accomplished by establishing rules or policies that different gateways operate on different hardware, or at least applying restrictions or other policies to particular instances 210 with respect to their underlying hardware. In this manner, different configurations may provide for redundancy in the event of a hardware failure.

In at least one embodiment, there may be one or more communication channels between components of the gateways 212A, 212B. For example, paired instances 210 and/or bridges 214 may be in communication with one another, such as to provide health or diagnostic information, which may be used by one or more control planes to switch or otherwise manage operation of the gateways 212. Health information for the gateways 212 may also be provided to an administrator, such as one associated with the cloud service 204, in order to manage traffic or configuration settings for the gateways 212. For example, if information indicative of an upcoming hardware failure is detected by the administrator, different instances may be provisioned within the second gateway 212B to accommodate increased loads. Furthermore, more gateways 212 may be established in order to maintain certain policy considerations, such as maintaining separate hardware operation between paired instances. It should be appreciated that various embodiments may not include direct communication between gateways 212A, 212B.

In this example, various instances 210 may include one or more bridges 214, which may be used as flows to direct and fan out a stream. For example, the bridges may be used to initialize or otherwise begin one or more processes in order to enable transmission to the cloud service 204. In various embodiments, the bridges 214 may direct traffic to a variety of different sources and may execute, or cause to be executed, a variety of different operations. In various embodiments, an instance 210 may be limited to a single bridge 214. In at least one embodiment, an instance 210 may have multiple bridges 214. Moreover, gateways 212 may be limited to a single bridge 214 or may contain multiple bridges 214. Furthermore, as noted above with respect to paired instances, different bridges 214 may also be paired and may be subject to one or more use constraints, such as maintaining pairs of bridges 214 on different underlying hardware to provide redundancy to protect against potential hardware failure.

In various embodiments, the bridge 214 corresponds to a set of software operations configured to execute one or more tasks, which may run in a docker container associated with a specific instance 210. As shown, the bridge 214 is positioned on-prem within the provider premises 202 and executes on hardware owned or otherwise managed by the provider. Such a bridge 214 may be configured and utilized in a similar manner as one in the cloud, such as one that is part of a cloud flow or set of operations, but may also be managed or otherwise monitored by tools associated with the cloud service 204, thereby providing a simplified set up and operations process. Additionally, sets of bridges 214 may be managed through a common interface or control plane, such as an API provided by the cloud service 204, to enable users to manage and monitor their operations from a central location. In at least one embodiment, the provider may have a limited or restricted set of configuration settings that the provider can adjust. For example, the connection between the bridge 214 and the cloud service 204 may be a managed connection where the cloud service 204 can adjust or change settings in accordance with various transmission protocols or based on information acquired by the cloud service 204.

The managed connection may be opaque or otherwise unavailable or unseen to the user, as the managed connection may be controlled, monitored, and adjusted by the cloud service 204. For example, the cloud service 204 may select which protocols (e.g., user datagram protocol, secure reliable transport, proprietary protocols, etc.) are used to facilitate transmission of the feed to the cloud service 204. It should be appreciated that a first protocol may be selected as a primary protocol with others designated as backups in the event of a transmission error or the like.

In operation, feeds 208, such as video feeds, are distributed over the provider networks 206A, 206B to the gateways 212A, 212B for transmission via the bridges 214A, 214B to the cloud service 204. The feeds 208 may be duplicative or may be different feeds. As shown in this example, the feed 208A is transmitted to both the first gateway 212A and the second gateway 212B, with a similar configuration shown for the feed 208B. Thereafter, the feeds 208 are fanned out to the cloud service 204 and transmitted to zones 216A, 216B (e.g., activity zones) which may be connected to one another via a private high-speed network, for example a fiber communication connection. These zones 216A, 216B may provide an isolated failure domain including one or more datacenter facilities with separate power, separate networking, and separate cooling than those in another zone. The zones 216B, 216B may include compute resources, such as various servers, that can execute different flows 218, which may correspond to a set of operations or software configuration to perform one or more tasks. For example, in this instance, the tasks may include modifications to the feed, adding security features, and then transmission to one or more selected endpoints, among other options. In this manner, various features of the cloud service 204 may be utilized in an on-prem environment and then provided back to the cloud service 204 for further distribution and management, thereby providing an end-to-end solution for transmission of video feeds, such as live video.

As described herein, various embodiments, may be directed toward a managed service that may collect various cloud and on-prem tasks within a unified framework to simplify operations for a cloud content provider. For example, the cloud content provider may make various calls or requests to the cloud service 204 to execute different processes using either on-prem resources and/or cloud-based resources. Furthermore, tools and features of the cloud service 204 may be implemented at the on-prem location, such as scaling instances 210 and the like. For example, the cloud content provider may establish one or more workflows and the cloud service 204 may determine that additional instances 210, for example within a specified cluster, are needed to execute the workflow. As a result, the cloud service 204 may advise, or automatically add, additional instances 210 to execute the process. Tuning of instances 210 may be performed by the cloud service 204, for example, by determining whether sufficient capacity is provided and then adding or removing capacity to enhance efficiencies. As such, the managed service may provide an interface to access different features of the cloud service for use with various on-prem equipment that has been registered to execute software packages associated with the cloud service.

Figure 3:
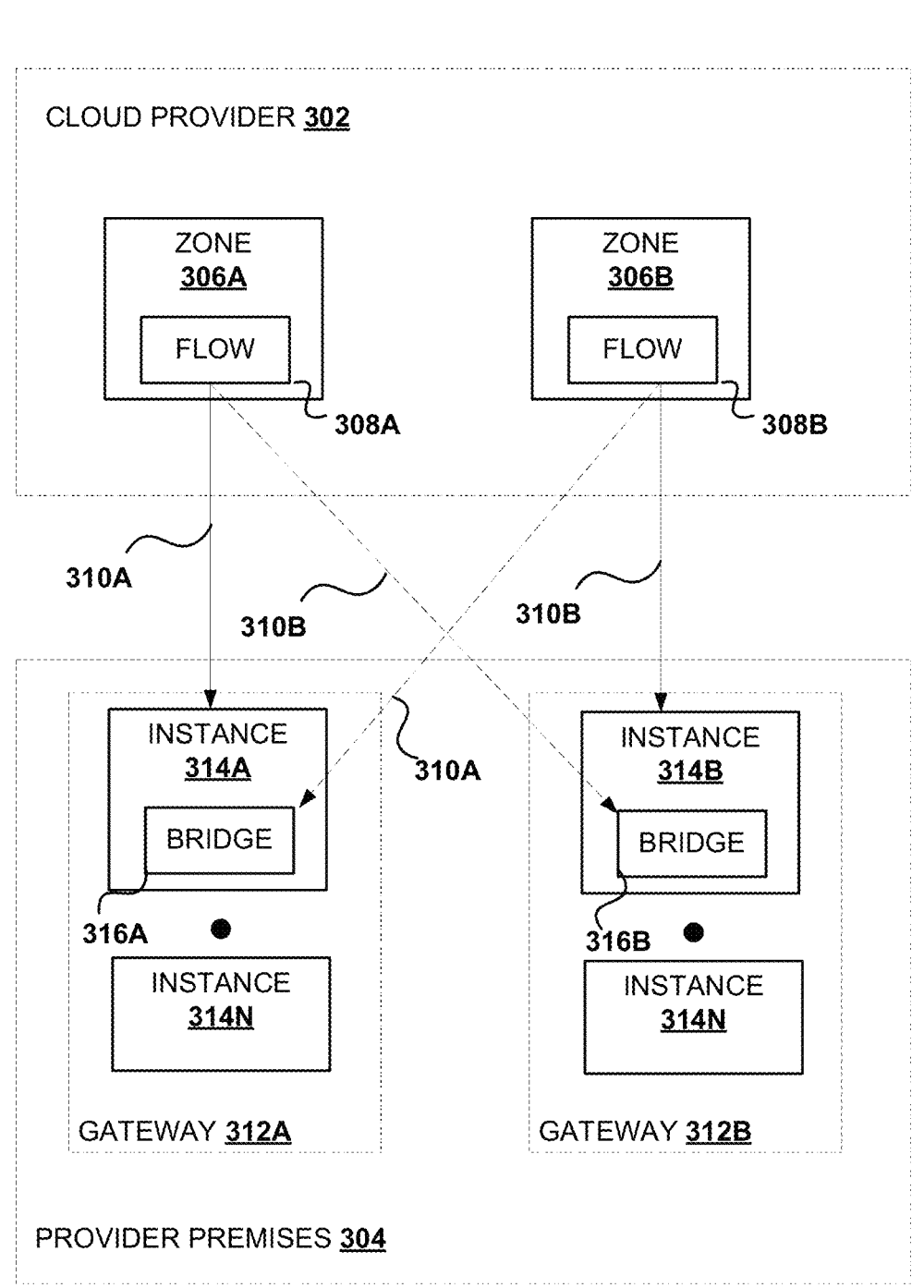
FIG. 3 illustrates an example environment for content distribution to a provider premises that can be utilized in accordance with various embodiments.

FIG. 3 illustrates an example distribution environment 300 which may be used with embodiments of the present disclosure. It should be appreciated that the distribution environment 300 may share one or more features with the environments 100, 200, and moreover, has been simplified for clarity. In at least one embodiment, the distribution environment 300 illustrates distribution from a cloud provider 302 (e.g., a cloud distribution service, an content distributor, etc.), which may be similar to or share features with the cloud provider 204 in FIG. 2 that receives a feed, to a distribution provider premises 304 (e.g., a cloud distribution provider premises, an ingress provider premises), which may be different from the provider, such as the cloud contribution provider premises 202, that initially transmits the feed to the cloud provider 302. In at least one embodiment, the distribution provider premises 304 corresponds to one or more datacenters, which may include various hardware components that are utilized to run one or more software packages, such as a containerized software package, that enables receipt, conversion, and/or distribution of various data streams, such as a feed corresponding to live video.

In this example, the cloud provider 302 includes the zones 306A, 306B with flows 308A, 308B. As noted, the flows 308A, 308B may refer to a series of steps or actions that are executed upon receipt of a command or other triggering event, such as an instruction to begin transmission upon receipt of a video feed. For example, as noted, the flows 308A, 308B may represent a framework for creating projects within a unified workflow for developing infrastructure and related dependencies. Accordingly, flows 308A, 308B may include initialization of resources, monitoring of traffic, updates, and the like. In this example, the flows 306A, 306B are illustrated as being within separate zones 306A, 306B, but it should be appreciated that zones 306A, 306B may include multiple different flows 308A, 308B.

Each flow 306A, 306B distributes a respective data stream 310 to the distribution provider premises 304, where gateways 312 are established that include respective instances 314, which may include one or more bridges 316. It should be appreciated that the gateways 312, instances 314, and/or bridges 316 may share one or more features with the gateways 212, instances 210, and/or bridges 214. Furthermore, the execution of the gateways 312, instances 314, and/or bridges 316 may also incorporate the managed service utilized by the cloud content provider premises 202 to provide a fully managed service utilizing one or more cloud resources. However, it should be appreciated that different configurations may be utilized for receipt of content as opposed to providing the content. As noted above, the bridges 316 may correspond to one or more containerized packages executing on infrastructure owned or otherwise controlled by the recipient of the data streams 310. The gateways 312 may correspond to logical groupings of instances 314, such as different sets of underlying hardware that are grouped in accordance with one or more policies to provide redundancy and/or support in the event of a hardware failure. In various embodiments, gateways 312 may be established with assistance from the cloud provider 302, such as associated with steps of the bridges 316 executing on different instances 314.

Regarding the zone 306A, the flow 308A may be used to package, encrypt, and transmit the stream 310A to the gateway 312A and the stream 310B to the gateway 312B. The streams 310A, 310B may be the same or different, for example one could be a duplicate copy, or they may be different streams that are managed or otherwise distributed according to instructions in the flow 308A. As will be appreciated, the stream 310A may be distributed to a variety of different endpoints, for example fanning out from the single flow 308A, thereby simplifying the distribution process for the provider. In this example, the zone 306B may also transmit the stream 310A to the gateway 312A and the stream 310B to the gateway 312B. This may be considered a hot-warm failover in that in the event the zone 306A fails or undergoes an error, the stream 310A from the zone 306B may be substituted or otherwise initiated to reduce a likelihood of a service error. For example, the stream 310A from the flow 308B may be prepared for transmission upon receipt that the transmission from the flow 308A is interrupted or failed, such as by caching or preparing segments of content to pick up where the flow 308A is interrupted. This type of redundancy may improve reliability and reduce a likelihood of fails, especially in situations where the zones 306A, 306B are in different geographic locations that may be subject to different circumstances, such as extreme weather events, power outages, and the like.

FIG. 4 illustrates an architecture 400 that may be used with embodiments of the present disclosure. The illustrated architecture 400 may be referred to as a container architecture associated with a configuration that is loaded onto instances 402 associated with hardware on a provider premises, as described above, such as the instances 210, 314. For example, the container 402 may be associated with a software package that is run on an instance 402 associated with a server in a datacenter, where the instance 402 may be registered via an agent 404. For example, the agent 404 may communicate with a provider, such as a cloud source, to establish the necessary components to facilitate execution of one or more operations associated with a distributed computing environment. The agent 404 may provide credentials and/or evaluate stored credentials to determine whether a provider is authorized to receive or support one or more tasks. Furthermore, the agent 404 may also be used to identify certain configuration settings associated with different providers, which may be stored within a user profile.

In this example, an input receiver 406 receives a content stream, such as a live video feed, from an external source, such as a provider network associated with the instance 402. For example, various live video streams may be recorded in a multicast format and the input receiver 406 may be a source-specific multicast agent where multicast packets are delivered from a specific source address. As a result, the input content is provided to the instance 402, where it may be converted, compresses, secured, and/or transmitted to the cloud for further distribution.

As mentioned, various embodiments provide a containerized solution that executes on-prem, such as a datacenter associated with a content provider. A virtualization manager 408 may be used to bundle software for execution on the instance 402. For example, the virtualization manager 480 may be used to establish a container that packages up code and its dependencies so that applications 410 may run quickly and reliably in different computing environments. Accordingly, the container established at a particular datacenter may also be run at other datacenters, thereby reducing a need to personalize actions at each datacenter. The virtualization manager 408 may receive and then load a lightweight software package, for example using a host operating system 412 that is loaded onto the infrastructure associated with the content provider. It should be appreciated that the virtualization manager 408 may enable multiple containers to run on the same underlying machine, and as a result, different containers may be established for different operations, such as a first container for a first stream, a second container for a second stream, and the like.

The illustrated applications 410 may be referred to as a stack and may represent different software applications that are used to run API calls or otherwise enable communication with the cloud service. For example, a first application may be used to convert the stream from multicast to unicast, while a second application may compress the stream. In this manner, different operations may be established within a container that are preconfigured to operate, and may use resources of the cloud service, thereby simplifying receipt and transmission of the data streams. Accordingly, containers may be managed and then deployed from the cloud source to run on infrastructure associated with the content provider, thereby providing a simplified service that leverages capabilities of the cloud service while enabling execution on-prem.

FIG. 5 illustrates an example process 500 for provider content distribution that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, while this example is discussed with respect to a video stream, such as a live video stream, it should be appreciated that various embodiments may be associated with different content types. In this example, a software package is installed on a resource associated with a provider datacenter 502. The software package may correspond to a container or otherwise virtualization system and establishes, on an instance (e.g., a server, a hardware component, etc.) a set of applications and their dependencies to execute on an operating system of the instance. The software package may be received from an associated distributed resource environment, such as a cloud distributive service. In at least one embodiment, a bridge is established on the instance that permits communication with the cloud service, where communication may be provided over a managed communication pathway using one or more communication protocols. Moreover, the software package may enable the instance to be part of a managed service associated with the distributed resource environment, which may enable the instance to leverage one or more cloud resources while using on-prem hardware.

An instance may be registered with the cloud service 504. For example, the instance may correspond to a server within a rack in the datacenter and the registration may be to associate the instance with an account the provider has established with the cloud service. Accordingly, the cloud service may recognize the instance and requests or transmission from the instance as being associated with operations of the software package. As a result, the instance may utilize the managed service associated with the cloud service in order to provide end-to-end management and operations. For example, an API may be used to make calls to the cloud service that may cause execution of one or more cloud flows to allocate resources, perform tasks, and the like. The registered instance may permit different hardware components to execute tasks associated with the cloud services in the on-prem location while still maintaining various features of the cloud service, such as managed connections or data collection and evaluation. In at least one embodiment, the instance is grouped within a gateway 506. The gateway may correspond to a logical grouping of instances, where different instances may be separated or otherwise associated with different gateways based on their underlying hardware. In this manner, the gateways may be used to ensure that paired instances or intended redundances are not present on the same hardware in the event of a failure or error.

In at least one embodiment, the instance may receive an input content stream 508. For example, a provider network may transmit a content stream to the instance. It should be appreciated that instances may receive multiple different content streams from any number of provider networks. The input content stream, in an example where the stream is a live video feed, may be in a multicast format. While this format may be acceptable for location distribution, it may be challenging or otherwise undesirable when transmitting the input content stream to a cloud service. Accordingly, the input content stream may be converted to a distribution format 510. For example, the multicast stream may be converted to unicast, which may be compatible with the cloud service. The input content stream, after conversion, may then be transmitted to the cloud service 512. The transmission may be associated with a bridge, which may be established as part of the software package executing on the instance. The bridge may include one or more steps or actions prior to transmission, such as compression, encryption, association with instructions, and the like. In this manner, an on-prem solution may be utilized in concert with a cloud service in order to receive and transmit an input content stream. This input content stream may then be distributed to desired endpoints from the cloud service.

FIG. 6 illustrates an example process 600 for content distribution that can be utilized in accordance with various embodiments. In this example, a cloud service receives a content stream from a content provider 602. The content provider may have an account associated with the cloud service and may transmit the content stream as part of a flow via a registered bridge. For example, a software package executing on infrastructure associated with the content provider may be used to receive and transmit the content stream to the cloud service. The content stream may be associated with instructions 604. For example, the instructions may include a distribution list, formatting requirements, and the like. These instructions may be used, at least in part, to determine a distribution list for the content stream 606. The distribution may occur such that it fans out from the cloud service in that multiple different endpoints may be selected to receive the content stream from a single managed location within the cloud, however, it should be appreciated that multiple different flows within the cloud may be used to transmit the content stream, such as flow associated with different zones.

In at least one embodiment, a flow established with the content stream in the cloud service is executed to perform one or more specified operations 608. For example, data may be compressed and encrypted prior to transmission. Additionally, the content stream may be segmented, associated with secondary content, or undergo enhancements prior to transmission. These operations may be established as a part of a predetermined flow to simplify and speed up the distribution process so that the provider does not need to specify these operations for each specific content stream. The content stream may then be transmitted to one or more destination endpoints 610 using one or more selected communication protocols.

FIG. 7 illustrates an example process 700 for provider content receipt and distribution that can be utilized in accordance with various embodiments. In this example, a software package is initiated on a resource within a content distributor datacenter 702. The software package may be a containerized solution that executes on one or more underlaying hardware resources, such as a server. As noted above, execution of the software package may enable the hardware resources to access or otherwise utilize a managed cloud service for content distribution. The hardware resource, or a portion thereof, may be referred to as an instance, and the instance may be registered with a cloud service 704. Registration may be performed using one or more of the applications associated with the software package.

In various embodiments, instances may be logically grouped into gateways 706, where a gateway can include any reasonable number of instances and includes at least one bridge. The bridge may be utilized to receive a communication from the cloud service 708. Once a content stream is received, the content stream may be converted into a distribution format 710, which may be different from a format associated with the cloud service. For example, the content stream may be converted from a unicast stream to a multicast stream. The distribution datacenter may then distribute the content to various authorized partners and affiliates 712.

Figure 8:
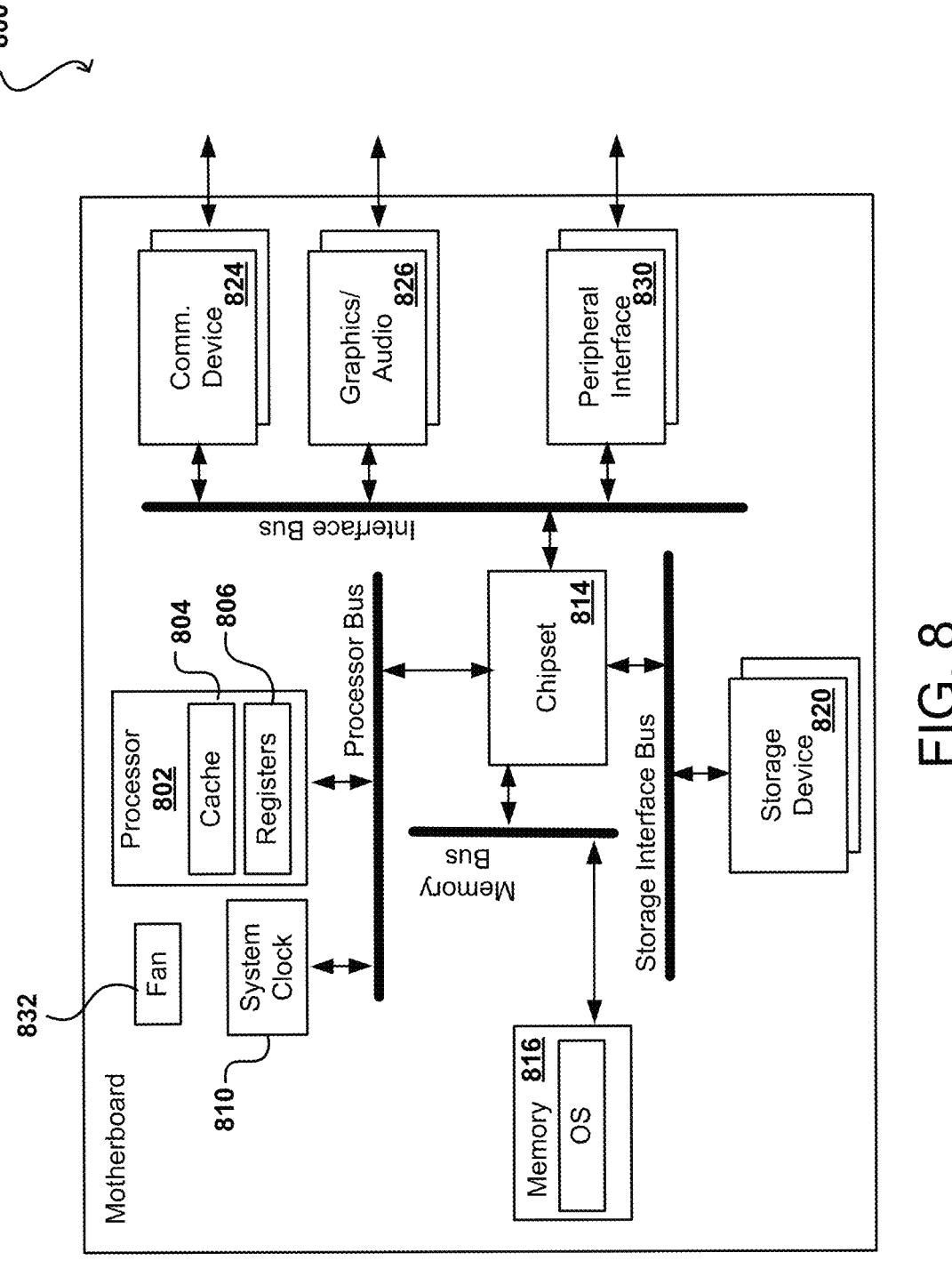
FIG. 8 illustrates components of an example computing device that can be utilized in accordance with various embodiments.

Computing resources, such as servers, that can have software and/or firmware updated in such a matter will generally include at least a set of standard components configured for general purpose operation, although various proprietary components and configurations can be used as well within the scope of the various embodiments. FIG. 8 illustrates components of an example computing device 800 that can be utilized in accordance with various embodiments. As known for computing devices, the computer will have one or more processors 802, such as central processing units (CPUs), graphics processing units (GPUs), and the like, that are electronically and/or communicatively coupled with various components using various buses, traces, and other such mechanisms. A processor 802 can include memory registers 806 and cache memory 804 for holding instructions, data, and the like. In this example, a chipset 814, which can include a northbridge and southbridge in some embodiments, can work with the various system buses to connect the processor 802 to components such as system memory 816, in the form or physical RAM or ROM, which can include the code for the operating system as well as various other instructions and data utilized for operation of the computing device. The computing device can also contain, or communicate with, one or more storage devices 820, such as hard drives, flash drives, optical storage, and the like, for persisting data and instructions similar, or in addition to, those stored in the processor and memory. The processor 802 can also communicate with various other components via the chipset 814 and an interface bus (or graphics bus, etc.), where those components can include communications devices 824 such as cellular modems or network cards, media components 826, such as graphics cards and audio components, and peripheral interfaces 830 for connecting peripheral devices, such as printers, keyboards, and the like. At least one cooling fan 832 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 802 can obtain data from physical memory 816, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 804 in at least some embodiments. The computing device 800 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 830, a communication device 824, a graphics or audio card 826, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 802 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a processor bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As mentioned, such a configuration can be used in some embodiments to provide resource capacity for one or more users or customers as part of a shared resource environment. FIG. 9 illustrates an example of one such environment 900 in which aspects of the various embodiments can be implemented. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. Additionally, if a particular decision or action is described as being made or performed "based on" a condition or piece of information, this should not be interpreted as that decision or action being made or performed exclusively based on that condition or piece of information, unless explicitly so stated.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:

initiating, on a compute instance hosted on a physical resource at an on-premises location of a content distributor, a software package associated with a distributed computing environment;

registering the compute instance with the distributed computing environment;

grouping the compute instance with one or more additional compute instances within a gateway including a bridge executing within at least one of the compute instance or the one or more additional compute instances;

receiving, via the bridge, a content stream from the distributed computing environment;

converting, at the compute instance using one or more applications of the software package, the content stream into a distribution content stream; and transmitting the distribution content stream.

2. The computer-implemented method of claim 1, wherein one or more properties of the distribution content stream are different from the content stream.

3. The computer-implemented method of claim 2, wherein the one or more properties include at least one of a transmission mode, a compression ratio, or a security status.

4. The computer-implemented method of claim 1, further comprising:

determining the compute instance is executing on a first set of underlying hardware associated with the physical resource;

determining a second compute instance of the one or more additional compute instances is executing on a second set of underlying hardware associated with a second physical resource; and selecting the second compute instance for grouping within the gateway.

5. The computer-implemented method of claim 4, wherein the compute instance is paired with the second compute instance.

6. The computer-implemented method of claim 1, further comprising:

receiving a second content stream from the distributed computing environment to at least one of the compute instance or the one or more additional compute instances within the gateway, wherein the second content stream is a duplicate of the content stream.

7. The computer-implemented method of claim 6, further comprising:

determining an error associated with the content stream; and converting, at the compute instance using the one or more applications of the software package, the second content stream into the distribution content stream.

8. The computer-implemented method of claim 1, further comprising:

determining a set of endpoints associated with one or more recipients of the distribution content stream; and determining the one or more recipients have authorization to receive the distribution content stream.

9. A computer-implemented method, comprising:

initiating a managed software application using an on-premises resource for a content distributor;

grouping a compute instance associated with the managed software application and one or more additional managed software applications associated with one or more additional compute instances within a gateway;

executing a bridge within the gateway, using at least one of the compute instance or the one or more additional compute instances, to form a communication channel with a distributed computing environment;

receiving, from the distributed computing environment, a content stream;

converting, using the managed software application, the content stream into a distribution content stream; and transmitting the distribution content stream to one or more endpoints.

10. The computer-implemented method of claim 9, further comprising:

receiving a second content stream from the distributed computing environment to at least one of the compute instance or the one or more additional compute instances within the gateway, wherein the second content stream is a duplicate of the content stream.

11. The computer-implemented method of claim 10, further comprising:

determining an error associated with the content stream; and converting, at the compute instance using the managed software application, the second content stream into the distribution content stream.

12. The computer-implemented method of claim 10, further comprising:

determining an error associated with the compute instance; and converting, at the one or more additional compute instances using a second managed software application, the second content stream into the distribution content stream.

13. The computer-implemented method of claim 9, wherein the distribution content stream has at least one of a different transmission mode, a different compression ratio, or a different security status as the content stream.

14. The computer-implemented method of claim 9, further comprising:

initiating a second managed software application of the one or more additional managed software applications on a second compute instance associated with a second on-premises resource for the content distributor; and selecting the second managed software application for grouping within the gateway.

15. The computer-implemented method of claim 14, wherein the compute instance of managed software application is paired with the second compute instance of the second managed software application.

16. A system, comprising:

at least one processor; and memory including instructions that, when executed by the at least one processor, cause the system to:

initiate a managed software application using an on-premises resource for a content distributor;

group a compute instance associated with the managed software application and one or more additional managed software applications associated with one or more additional compute instances within a gateway;

execute a bridge within the gateway, using at least one of the compute instance or the one or more additional compute instances, to form a communication channel with a distributed computing environment;

receive, from the distributed computing environment, a content stream;

convert, using the managed software application, the content stream into a distribution content stream; and transmit the distribution content stream to one or more endpoints.

17. The system of claim 16, wherein the instructions when executed further cause the system to:

initiate a second managed software application of the one or more additional managed software applications on a second compute instance associated with a second on-premises resource for the content distributor; and select the second managed software application for grouping within the gateway.

18. The system of claim 17, wherein the compute instance of managed software application is paired with the second compute instance of the second managed software application.

19. The system of claim 18, wherein the instructions when executed further cause the system to:

receive a second content stream from the distributed computing environment to at least one of the compute instance or the one or more additional compute instances within the gateway, wherein the second content stream is a duplicate of the content stream.

20. The system of claim 16, wherein the distribution content stream has at least one of a different transmission mode, a different compression ratio, or a different security status as the content stream.

* * * * *